(12) United States Patent
Govindassamy et al.

(10) Patent No.: US 10,212,633 B1
(45) Date of Patent: Feb. 19, 2019

(54) METHOD AND APPARATUS FOR CELL RESELECTION

(71) Applicant: MBIT WIRELESS, INC., Irvine, CA (US)

(72) Inventors: Sivakumar Govindassamy, Irvine, CA (US); Bhaskar Patel, San Clemente, CA (US)

(73) Assignee: MBIT WIRELESS, INC., Irvine, CA (US)

( * ) Notice: Subject to any disclaimer, the term of this patent is extended or adjusted under 35 U.S.C. 154(b) by 0 days.

(21) Appl. No.: 15/205,475

(22) Filed: Jul. 8, 2016

(51) Int. Cl.
| | |
|---|---|
| *H04W 36/00* | (2009.01) |
| *H04W 36/16* | (2009.01) |
| *H04W 40/00* | (2009.01) |
| *H04W 68/02* | (2009.01) |
| *H04W 64/00* | (2009.01) |
| *H04W 48/20* | (2009.01) |
| *H04L 29/06* | (2006.01) |
| *H04H 20/38* | (2008.01) |
| *H04W 84/04* | (2009.01) |

(52) U.S. Cl.
CPC .......... *H04W 36/165* (2013.01); *H04H 20/38* (2013.01); *H04L 69/28* (2013.01); *H04W 36/0061* (2013.01); *H04W 40/005* (2013.01); *H04W 48/20* (2013.01); *H04W 64/003* (2013.01); *H04W 68/02* (2013.01); *H04W 84/042* (2013.01)

(58) Field of Classification Search
CPC ..... H04W 36/08; H04W 36/14; H04W 36/18; H04W 36/305
See application file for complete search history.

(56) References Cited

U.S. PATENT DOCUMENTS

| | | | | |
|---|---|---|---|---|
| 6,628,942 | B1* | 9/2003 | Beming | H04W 68/00 455/432.1 |
| 8,280,377 | B2* | 10/2012 | Lee | H04W 36/0077 370/329 |
| 2010/0093356 | A1* | 4/2010 | Lee | H04W 4/20 455/437 |
| 2010/0130218 | A1* | 5/2010 | Zhang | H04W 48/12 455/450 |
| 2010/0222055 | A1* | 9/2010 | Cho | H04J 11/0086 455/434 |

(Continued)

*Primary Examiner* — Shantell L Heiber
(74) *Attorney, Agent, or Firm* — Firm, David, Littenberg, Krumholz & Mentlik, LLP

(57) ABSTRACT

In cellular communication systems, the success rate for incoming calls for a client terminal in idle mode is related to the successful reception of paging messages. The instances for paging message transmission, known as paging occasions, may be based on a client terminal's unique identity. The network transmits a paging message addressed to a specific client terminal in its specific paging occasion. In addition to the reception of paging messages, a client terminal may be required to search and monitor neighbor cells for cell reselection and handoffs. A method and apparatus are disclosed that improve the cell reselection by using the known a priori information to categorize the neighbor cells, to categorize the cell reselection types, and to perform cell reselection to an appropriate neighbor cell at the opportune time such that a paging message reception may be neither missed nor delayed during the cell reselection.

20 Claims, 8 Drawing Sheets

(56) References Cited

U.S. PATENT DOCUMENTS

| | | | |
|---|---|---|---|
| 2010/0278146 A1* | 11/2010 | Aoyama | H04W 48/20 370/331 |
| 2013/0109391 A1* | 5/2013 | Lee | H04W 48/12 455/436 |
| 2014/0254553 A1* | 9/2014 | Shin | H04W 68/02 370/331 |
| 2015/0126206 A1* | 5/2015 | Krishnamurthy | H04W 76/18 455/452.1 |
| 2017/0353974 A1* | 12/2017 | Rupanagudi Venkata | H04W 74/008 |

* cited by examiner

FIG. 5

| Serving Cell Type | Target Neighbor Cell type | | | | | | | | |
|---|---|---|---|---|---|---|---|---|---|
| | NGHBR_CELL_TYPE0 | NGHBR_CELL_TYPE1 | NGHBR_CELL_TYPE2 | NGHBR_CELL_TYPE3 | NGHBR_CELL_TYPE4 | NGHBR_CELL_TYPE5 | NGHBR_CELL_TYPE6 | NGHBR_CELL_TYPE7 | NGHBR_CELL_TYPE8 |
| SERVING ACCEPTABLE CELL | CRST1 | CRST2 | CRST3 | NA | NA | NA | CRST5 | CRST5 | CRST5 |
| SERVING SUITABLE CELL | CRST1 | CRST2 | CRST3 | CRST4 | CRST4 | CRST4 | CRST5 | CRST5 | CRST5 |

METHOD AND APPARATUS FOR CELL RESELECTION

BACKGROUND

Typically, as shown in FIG. 1, a wireless communication system 10 comprises elements such as a client terminal or mobile station 12 and base stations 14. Other network devices which may be employed, such as a mobile switching center, are not shown. In some wireless communication systems there may be only one base station and many client terminals while in some other communication systems such as cellular wireless communication systems there are multiple base stations and a large number of client terminals communicating with each base station.

As illustrated, the communication path from the base station (BS) to the client terminal direction is referred to herein as the downlink (DL) and the communication path from the client terminal to the base station direction is referred to herein as the uplink (UL). In some wireless communication systems the client terminal or mobile station (MS) communicates with the BS in both DL and UL directions. For instance, this is the case in cellular telephone systems. In other wireless communication systems the client terminal communicates with the base stations in only one direction, usually the DL. This may occur in applications such as paging.

The base station with which a client terminal is communicating is referred to as the serving base station. In some wireless communication systems the serving base station is normally referred to as the serving cell. While in practice a cell may include one or more base stations, a distinction is not made between a base station and a cell, and such terms may be used interchangeably herein. The base stations that are in the vicinity of the serving base station are called neighbor cell base stations. Similarly, in some wireless communication systems a neighbor base station is normally referred to as a neighbor cell.

Cellular wireless communication systems may use multiple frequencies within a cell and across different cells. If a neighbor cell is using the same frequency as the serving cell, it is referred to as an intra-frequency neighbor cell. If a neighbor cell is using a frequency different from the serving cell, it is referred to as an inter-frequency neighbor cell. A network may use different Radio Access Technologies (RATs) for providing various services. In a particular network, the cells of different RAT's may be overlapping or adjacent to each other. If a neighbor cell is using a RAT that is different from the RAT used by the serving cell, it is referred to as an inter-RAT neighbor cell.

When a client terminal is not in active call or active data transfer, it is considered to be in idle mode. In idle mode, when a client terminal moves away from the coverage area of its current serving cell and it may be in the coverage area of one or more neighbor cells, it may initiate a cell reselection procedure towards one of the neighbor cells. The neighbor cell towards which the cell reselection procedure is initiated is referred to as a target cell. After the cell reselection procedure is completed successfully, the target cell becomes the new serving cell for the client terminal.

In idle mode, a client terminal for the most part may turn off a majority of its circuitry to reduce power consumption. This is often referred to as "sleep" state, a sub-state within the idle mode. A client terminal may remain in a sleep state for a long duration and may wake up at the desired time window where it expects to receive the paging messages and certain broadcast messages. The success rate for the incoming calls (e.g., mobile terminated voice calls and/or data calls) in a client terminal is directly related to the successful reception of paging messages. Normally, in idle mode, in addition to the reception of paging messages and broadcast messages, a client terminal may continue to search and monitor neighbor cells.

When a client terminal performs a network registration procedure to get service from a cell, it decodes the system information broadcast in the cell. The client terminal may store such system information for most recently visited cells for future reference. The system information carries important information regarding the cell reselection criteria. Such information includes but not limited to the tracking area code (TAC), Public Land Mobile Network Identity (PLMN ID), Closed Subscriber Group Identity (CSG ID), etc. This information may help to decide whether a cell is a "suitable cell" for the client terminal to avail all the services offered by it, or the cell is an "acceptable cell" where the client terminal may avail only limited services such as emergency calls. The client terminal may have to perform the network registration procedure to get service from the network and for the network to be able to page the client terminal for mobile terminated (incoming) calls. The network registration procedure may be typically performed by a client terminal with a particular cell. A group of cells in the geographic vicinity of each other may form a registration area. A registration area may be identified based on the system information of a cell. For example, the TACs of a group of cells in a registration area may be the same.

As long as a client terminal is in the same registration area, the client terminal may not perform network registration procedure again except that a periodic network registration update procedure may need to be performed even if the client terminal continues to move within the same registration area. If the client terminal moves to a cell which does not belong to the registration area in which the client terminal is registered, then the client terminal may perform network registration procedure to get access to and service from the network.

When a client terminal is in idle mode, the network may only be aware of the location of the client terminal at the registration area level. In order for a network to page a client terminal, it may need to send the paging message in all cells belonging to the same registration area. The instances for paging message transmission, known as paging occasions (POs), are usually derived based on a client terminal's unique identity and a paging cycle. The network may transmit a paging message addressed to a specific client terminal in its specific paging occasion. When a client terminal performs cell reselection, the exact instances of paging occasions may be different in the new serving cell. Depending on the exact timing of the cell reselection and the timing of the POs in the old serving cell and the new serving cell, the client terminal may potentially miss a paging message or may receive it with delay.

SUMMARY

A method and apparatus are disclosed that improve cell reselection by using known a priori information to categorize neighbor cells, to categorize cell reselection types, and to perform cell reselection to an appropriate neighbor cell at the opportune time such that a paging message reception may neither missed nor delayed during the cell reselection which may lead to improved user experience.

In accordance with an aspect of the present disclosure, a method for cell reselection in a wireless communication system may include controlling, by a processing device, cell reselection for a client terminal based on determining a type of a neighbor cell, wherein the type of the neighbor cell is determined based on whether stored information about the neighbor cell which is valid is available and a determination from the stored information which is valid of at least one of (i) whether the neighbor cell is suitable or acceptable, (ii) whether the neighbor cell belongs to a current network registration area, (iii) whether the client terminal is registered to a current serving cell using a first Radio Access Technology (RAT) and a second RAT used by the neighbor cell which is different from the first RAT, (iv) whether network registration is required for inter-RAT cell reselection, or (v) a next occurrence of a paging occasion (PO) in the neighbor cell.

In one alternative, the type of the neighbor cell may be an inter-RAT neighbor cell or an intra-RAT neighbor cell, wherein when the type of the neighbor cell is an inter-RAT neighbor cell, the type of the neighbor cell is an inter-frequency neighbor cell, and wherein when the type of the neighbor cell is an intra-RAT neighbor cell, the type of the neighbor cell is an inter-frequency neighbor cell or an intra-RAT neighbor cell.

In one alternative, whether the stored information about the neighbor cell is valid may be determined based on a timer.

In one alternative, the timer may be refreshed such that the stored information is maintained valid, based on whether broadcast system information or a change mark for the broadcast system information is received at the client device.

In one alternative, the stored information may indicate at least one of a tracking area code (TAC), a Public Land Mobile Network Identity (PLMN ID), a Closed Subscriber Group Identity (CSG ID), a paging cycle, an updated network radio frame number or registration status.

In one alternative, the type of the neighbor cell may be determined to be at least one of: (i) a first type of neighbor cell for which the neighbor cell is an intra-frequency neighbor cell, the stored information for the neighbor cell is valid, the neighbor cell is a suitable cell and the neighbor cell belongs to the current network registration area; (ii) a second type of neighbor cell for which the neighbor cell is an inter-frequency neighbor cell, the stored information for the neighbor cell is valid, the neighbor cell is a suitable cell and the neighbor belongs to the current network registration area; (iii) a third type of neighbor cell for which the neighbor cell is an inter-RAT neighbor cell, the stored information for the neighbor cell is valid, the neighbor cell is a suitable cell, the neighbor cell belongs to the current network registration area and the client terminal is registered in the first RAT and the second RAT; (iv) a fourth type of neighbor cell for which the neighbor cell is an intra-frequency neighbor cell, the stored information for the neighbor cell is valid, the neighbor cell is an acceptable cell and the neighbor cell does not belong to the current network registration area; (v) a fifth type of neighbor cell for which the neighbor cell is an inter-frequency neighbor cell, the stored information for the neighbor cell is valid, the neighbor cell is an acceptable cell and the neighbor cell does not belong to the current network registration area; (vi) a sixth type of neighbor cell for which the neighbor cell is an inter-RAT neighbor cell, the stored information for the neighbor cell is valid, the neighbor cell is an acceptable cell and the neighbor does not belong to the current network registration area; (vii) a seventh type of neighbor cell for which the neighbor cell is an intra-frequency neighbor cell, the stored information for the neighbor cell is not valid and whether the neighbor cell belongs to the current network registration area is not known; (viii) an eighth type of neighbor cell for which the neighbor cell is an inter-frequency neighbor cell, the stored information for the neighbor cell is not valid and whether the neighbor cell belongs to the current network registration area is not known; and (ix) a ninth type of neighbor cell for which the neighbor cell is an inter-RAT neighbor cell, the stored information for the neighbor cell is not valid and whether the neighbor cell belongs to the current network registration area is not known.

In one alternative, the method may include controlling, by the processing device, determining a time window to perform the cell reselection based on the type of the neighbor cell, such that a first paging message at the PO in the neighbor cell and a second paging message at a PO of the serving cell are received by the client terminal when the cell reselection is being performed.

In one alternative, the method may include controlling, by the processing device, determining a time window to perform the cell reselection based on the type of the neighbor cell; and wherein the cell reselection to be performed has a type including at least one of: a first cell reselection type to be performed when the neighbor cell is determined to be the first type of neighbor cell, a second cell reselection type to be performed when the neighbor cell is determined to be the second type of neighbor cell, a third cell reselection type to be performed when the neighbor cell is determined to be the third type of neighbor cell, a fourth cell reselection type to be performed when the neighbor cell is determined to be the fourth, fifth or sixth type of neighbor cell, and a fifth cell reselection type to be performed when the neighbor cell is determined to be the seventh, eighth or ninth type of neighbor cell.

In one alternative, a first time window TW1 and a second time window TW2 to perform the cell reselection may be adjacent to a given PO of the serving cell, a third time window TW3 to perform the cell reselection may be between first and second POs of the serving cell, and a time window TW4 to perform the cell reselection may be immediately prior to a given PO of the neighbor cell, and wherein, when the cell reselection to be performed is the fifth cell reselection type, the cell reselection is performed not in TW1 and in at least one of TW2, TW3 or TW4.

In accordance with an aspect of the present disclosure, an apparatus for cell reselection in a wireless communication system may include circuitry configured to control cell reselection for a client terminal based on determining a type of a neighbor cell, wherein the type of the neighbor cell is determined based on whether stored information about the neighbor cell which is valid is available and a determination from the stored information which is valid of at least one of (i) whether the neighbor cell is suitable or acceptable, (ii) whether the neighbor cell belongs to a current network registration area, (iii) whether the client terminal is registered to a current serving cell using a first Radio Access Technology (RAT) and a second RAT used by the neighbor cell which is different from the first RAT, (iv) whether network registration is required for inter-RAT cell reselection, or (v) a next occurrence of a paging occasion (PO) in the neighbor cell.

In one alternative of the apparatus, the type of the neighbor cell may be an inter-RAT neighbor cell or an intra-RAT neighbor cell, wherein when the type of the neighbor cell is an inter-RAT neighbor cell, the type of the neighbor cell is an inter-frequency neighbor cell, and wherein when the type of the neighbor cell is an intra-RAT neighbor cell, the type of the neighbor cell is an inter-frequency neighbor cell or an intra-RAT neighbor cell.

In one alternative of the apparatus, whether the stored information about the neighbor cell is valid may be determined based on a timer.

In one alternative of the apparatus, the timer may be refreshed such that the stored information is maintained valid, based on whether broadcast system information or a change mark for the broadcast system information is received at the client device.

In one alternative of the apparatus, wherein the stored information may indicate at least one of a tracking area code (TAC), a Public Land Mobile Network Identity (PLMN ID), a Closed Subscriber Group Identity (CSG ID), a paging cycle, an updated network radio frame number or registration status.

In one alternative of the apparatus, the type of the neighbor cell may be determined to be at least one of: (i) a first type of neighbor cell for which the neighbor cell is an intra-frequency neighbor cell, the stored information for the neighbor cell is valid, the neighbor cell is a suitable cell and the neighbor cell belongs to the current network registration area; (ii) a second type of neighbor cell for which the neighbor cell is an inter-frequency neighbor cell, the stored information for the neighbor cell is valid, the neighbor cell is a suitable cell and the neighbor belongs to the current network registration area; (iii) a third type of neighbor cell for which the neighbor cell is an inter-RAT neighbor cell, the stored information for the neighbor cell is valid, the neighbor cell is a suitable cell, the neighbor cell belongs to the current network registration area and the client terminal is registered in the first RAT and the second RAT; (iv) a fourth type of neighbor cell for which the neighbor cell is an intra-frequency neighbor cell, the stored information for the neighbor cell is valid, the neighbor cell is an acceptable cell and the neighbor cell does not belong to the current network registration area; (v) a fifth type of neighbor cell for which the neighbor cell is an inter-frequency neighbor cell, the stored information for the neighbor cell is valid, the neighbor cell is an acceptable cell and the neighbor cell does not belong to the current network registration area; (vi) a sixth type of neighbor cell for which the neighbor cell is an inter-RAT neighbor cell, the stored information for the neighbor cell is valid, the neighbor cell is an acceptable cell and the neighbor does not belong to the current network registration area; (vii) a seventh type of neighbor cell for which the neighbor cell is an intra-frequency neighbor cell, the stored information for the neighbor cell is not valid and whether the neighbor cell belongs to the current network registration area is not known; (viii) an eighth type of neighbor cell for which the neighbor cell is an inter-frequency neighbor cell, the stored information for the neighbor cell is not valid and whether the neighbor cell belongs to the current network registration area is not known; and (ix) a ninth type of neighbor cell for which the neighbor cell is an inter-RAT neighbor cell, the stored information for the neighbor cell is not valid and whether the neighbor cell belongs to the current network registration area is not known.

In one alternative of the apparatus, the circuitry may be configured to control determining a time window to perform the cell reselection based on the type of the neighbor cell, such that a first paging message at the PO in the neighbor cell and a second paging message at a PO of the serving cell are received by the client terminal when the cell reselection is being performed.

In one alternative of the apparatus, the circuitry may be configured to control determining a time window to perform the cell reselection based on the type of the neighbor cell; and wherein the cell reselection to be performed has a type including at least one of: a first cell reselection type to be performed when the neighbor cell is determined to be the first type of neighbor cell, a second cell reselection type to be performed when the neighbor cell is determined to be the second type of neighbor cell, a third cell reselection type to be performed when the neighbor cell is determined to be the third type of neighbor cell, a fourth cell reselection type to be performed when the neighbor cell is determined to be the fourth, fifth or sixth type of neighbor cell, and a fifth cell reselection type to be performed when the neighbor cell is determined to be the seventh, eighth or ninth type of neighbor cell.

In one alternative of the apparatus, a first time window TW1 and a second time window TW2 to perform the cell reselection may be adjacent to a given PO of the serving cell, a third time window TW3 to perform the cell reselection may be between first and second POs of the serving cell, and a time window TW4 to perform the cell reselection may be immediately prior to a given PO of the neighbor cell, and wherein, when the cell reselection to be performed is the fifth cell reselection type, the cell reselection is performed not in TW1 and in at least one of TW2, TW3 or TW4.

In accordance with an aspect of the present disclosure, a wireless communication device may include a receiver to receive a signal of a wireless communication system; and a processing device configured to control cell reselection at the wireless communication device based on determining a type of a neighbor cell, wherein the type of the neighbor cell is determined based on whether stored information about the neighbor cell which is valid is available and a determination from the stored information which is valid of at least one of (i) whether the neighbor cell is suitable or acceptable, (ii) whether the neighbor cell belongs to a current network registration area, (iii) whether the wireless communication device is registered to a current serving cell using a first Radio Access Technology (RAT) and a second RAT used by the neighbor cell which is different from the first RAT, (iv) whether network registration is required for inter-RAT cell reselection, or (v) a next occurrence of a paging occasion (PO) in the neighbor cell.

In one alternative of the wireless communication device, the type of the neighbor cell may be an inter-RAT neighbor cell or an intra-RAT neighbor cell, wherein when the type of the neighbor cell is an inter-RAT neighbor cell, the type of the neighbor cell is an inter-frequency neighbor cell, and wherein when the type of the neighbor cell is an intra-RAT neighbor cell, the type of the neighbor cell is an inter-frequency neighbor cell or an intra-RAT neighbor cell.

BRIEF DESCRIPTION OF THE DRAWINGS

FIG. 5 illustrates a table of neighbor cell types and the type of cell reselection that the client terminal may perform according to the aspects of the present disclosure.

DETAILED DESCRIPTION

Figure 1:
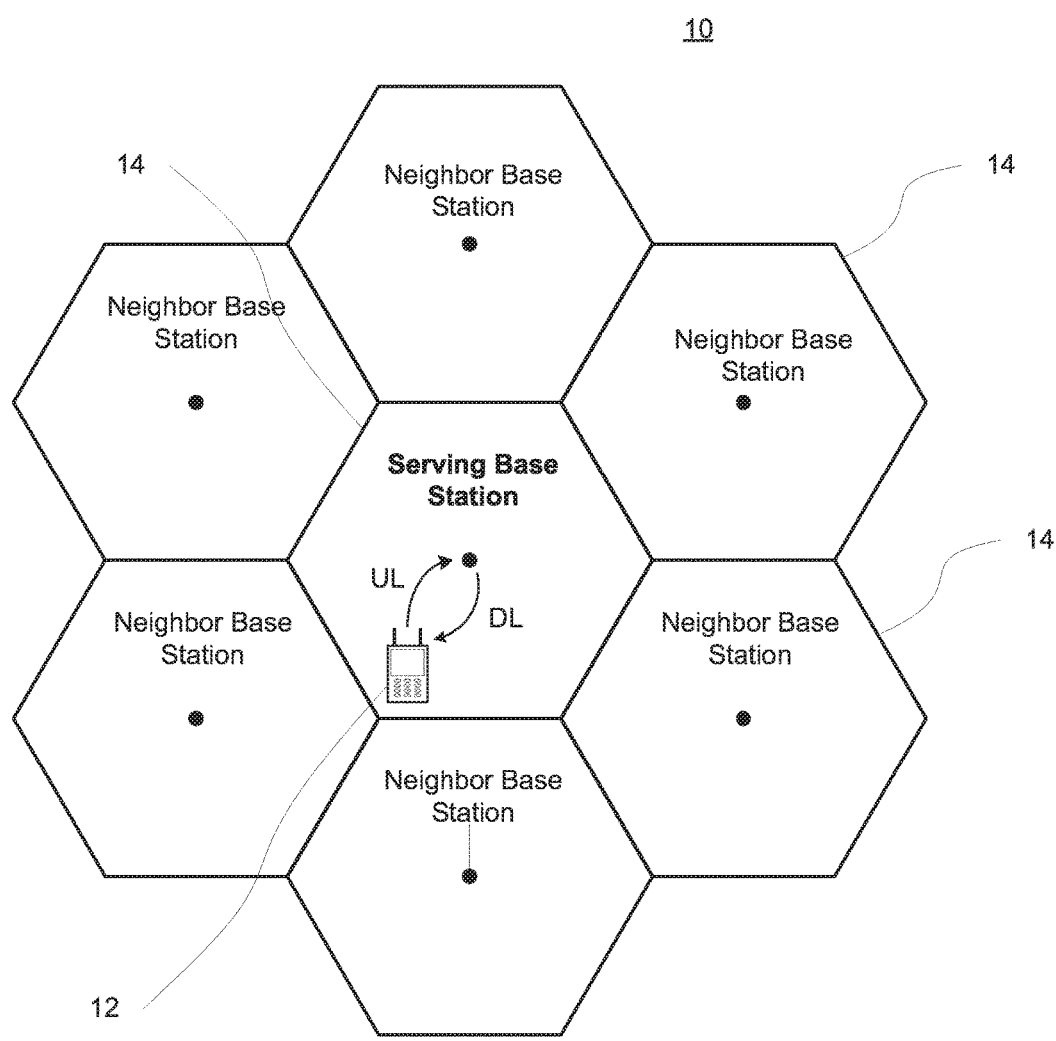
FIG. 1 illustrates a conventional wireless cellular communication system.

The foregoing aspects, features and advantages of the present disclosure will be further appreciated when considered with reference to the following description of preferred embodiments and accompanying drawings, wherein like reference numerals represent like elements. In describing the preferred embodiments of the disclosure illustrated in the appended drawings, specific terminology will be used for the sake of clarity. However, the disclosure is not intended to be limited to the specific terms used.

According to an aspect of the present disclosure, in addition to the conventional decision making criteria for cell reselection, a new level of decision making criteria may be used based on the known a priori information to categorize the neighbor cells, to categorize the cell reselection types, and to perform cell reselection to an appropriate neighbor cell at the opportune time such that a paging message reception may be neither missed nor delayed during the cell reselection.

According to an aspect of the present disclosure, the known a priori information used in the new additional level of decision making criteria is as follows:
1. Type of a neighbor cell
   a. Intra-frequency neighbor cell
   b. Inter-frequency neighbor cell
   c. Inter RAT frequency neighbor cells
2. Indication of whether "valid stored information" about a cell is available or not. A client terminal may keep the validity of stored information by maintaining a validity timer and may also keep the validity time refreshed whenever it receives the broadcast system information or the change mark for the broadcasted system information. When available, the stored information about a cell may include the following:
   a. PLMN ID
   b. TAC
   c. Paging cycle
   d. Updated network radio frame number
   e. Registration status
   f. CSG ID (if applicable)
3. Determination from the stored information about a cell
   a. Whether it is a "suitable cell" or an "acceptable cell"
   b. Whether a cell belongs to current registration area or not in the current registration area
   c. Indication of whether the client terminal is registered to the current serving cell for the serving cell RAT and neighbor cell RAT or only registered for the serving cell RAT
   d. Indication of whether inter-RAT cell reselection requires network registration or not
   e. The next occurrence of paging occasion in the neighbor cell For the serving cell, a client terminal always has decoded and stored essential system information. The serving cell may be categorized as one of the only two types as listed below.

SERVING SUITABLE CELL: A cell to which the client terminal is registered in a neighbor RAT network and may avail all the services without any limitation.

SERVING ACCEPTABLE CELL: A cell from which the client terminal may avail only limited service such as emergency call but not the normal services as the client terminal may not be registered to the network for availing all or some of the normal services.

For the neighbor cells, a client terminal may or may not have the essential system information decoded or stored. Furthermore, there are different types of neighbor cells as described earlier. According to an aspect of the present disclosure, considering the above two factors, the neighbor cells may be categorized into one of the following types:

NGHBR CELL TYPE0: This cell is an intra-frequency neighbor cell and the client terminal has valid stored information for this cell. Also, the cell is a suitable cell and it belongs to current registration area.

NGHBR CELL TYPE1: This cell is an inter-frequency neighbor cell and the client terminal has valid stored information for this cell. Also, the cell is a suitable cell and it belongs to current registration area.

NGHBR CELL TYPE2: This cell is an inter-RAT neighbor cell and the client terminal has valid stored information. Also, the cell is a suitable cell and belongs to current registration area. Furthermore, the client terminal is registered in both serving cell RAT and neighbor cell RAT. Inter-RAT cell reselection to this type of cell does not require network registration.

NGHBR CELL TYPE3: This cell is an intra-frequency neighbor cell and the client terminal has valid stored information. Also, the cell is an acceptable cell but does not belong to the current registration area.

NGHBR CELL TYPE4: This cell is an inter-frequency neighbor cell and the client terminal has valid stored information. Also, the cell is an acceptable cell and does not belong to the current registration area.

NGHBR CELL TYPE5: This cell is an inter-RAT neighbor cell and the client terminal has valid stored information. Also, the cell is an acceptable cell and does not belong to the current registration area.

NGHBR CELL TYPE6: This cell is an intra-frequency neighbor cell and the client terminal does not have valid stored information. Also, the client terminal may not know if the neighbor cell belongs to the current registration area.

NGHBR CELL TYPE7: This cell is an inter-frequency neighbor cell and the client terminal does not have valid stored information. Also, the client terminal may not know if the neighbor cell belongs to the current registration area.

NGHBR CELL TYPE8: This cell is an inter-RAT neighbor cell and the client terminal does not have valid stored information. Also, the client terminal, may not know if the neighbor cell belongs to current registration area.

Figure 2:
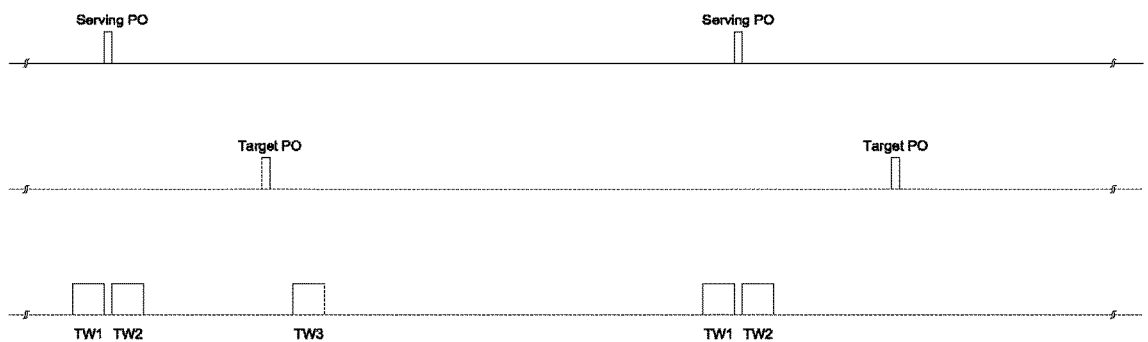
FIG. 2 illustrates an example of different measurement and cell reselection instances in relation to paging occasions.

Performing cell reselection may require making measurements on signal level and/or signal quality of neighbor cells. In order to reduce power consumption in a battery operated client terminal, typically the neighbor cell measurements may be performed adjacent to its paging occasion. In general, the neighbor cell measurement events may be triggered during one of the three different time windows as illustrated in FIG. 2.

Time windows TW1 and TW2 are adjacent to the PO and TW3 may be anywhere between two serving cell POs. Typically the neighbor cell measurements may be performed in any of these three time windows. If any cell reselection is performed, it may be also done during one of the three time windows. According to an aspect of the present disclosure, depending of the type of neighbor cell, the client terminal may decide the particular time window in which it may perform the cell reselection so that the client terminal may not miss a paging message addressed to it during the cell reselection process. This in turn may improve the mobile terminated (incoming) call performance.

According to an aspect of the present disclosure, five different cell reselection types are specified based on the neighbor cell type and the preferred time window order. Following are the five cell reselection types (CRSTs):

CRST1: This type of cell reselection may be performed for neighbor cells of type NGHBR CELL TYPE0.

Figure 3:
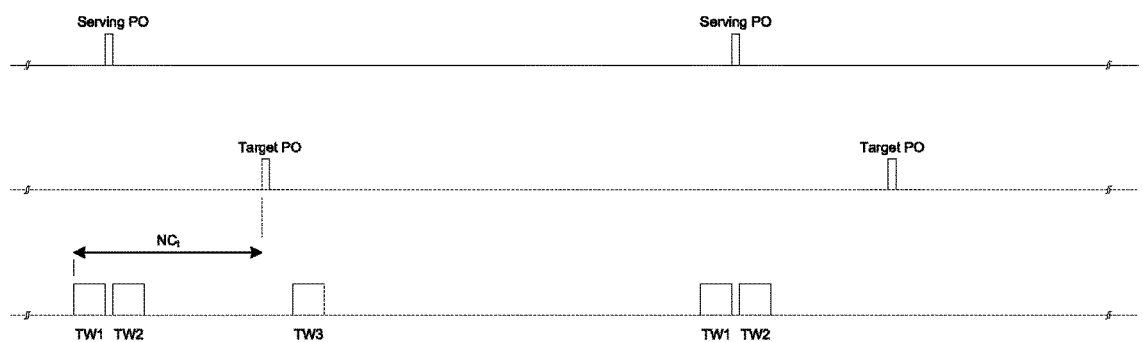
FIG. 3 illustrates an example of preferred timing of measurement and cell reselection under certain conditions according to the aspects of the present disclosure.

This type of reselection may require very little time, usually in terms of few milliseconds (ms). For example, in $3^{rd}$ Generation Partnership Project (3GPP) Long Term Evolution (LTE) wireless communication system it may takes about 2 ms to 3 ms for this type cell reselection. The actual time required for this type of cell reselection may vary depending on the type of RAT. Denote the time required in any RAT for this type of cell reselection as $NC_t$ ms. The PO for the client terminal in the target cell (neighbor cell to which reselection is being performed) is referred as Target PO and the PO in the current serving cell is referred as Serving PO. If the Target PO is $NC_t$ ms away from TW1 as illustrated in FIG. 3, this type of cell reselection may be preferably performed in TW1, so that the client terminal can complete the cell reselection before the Target PO and it can receive the very first paging message in the target cell after re-selection. If the Target PO closer than $NC_t$ ms, TW2 and TW3 are the preferred time windows where this type of cell reselection may be performed, which may have sufficient time to complete the reselection before the next Target PO.

CRST2: This type of cell reselection may be performed for neighbor cells of type NGHBR CELL TYPE1.

This type of cell reselection requires little more time than CRST1 as it requires additional time to tune to the frequency of the inter-frequency neighbor cell. Denote the time required in any RAT for this type of cell reselection as $NFC_t$ ms to tune to the neighbor cell, frequency and to time align the client terminal timing to the air interface timing of the target cell in a neighbor RAT. If the Target PO is $NFC_t$ ms away, this type of cell reselection may be preferably performed in TW1, so that the client terminal can complete the cell reselection before the Target PO and it can receive the very first paging message in the target cell after cell reselection. If the Target PO is closer than $NFC_t$ ms, TW2 and TW3 are the preferred time windows where this type of cell reselection may be performed, which have sufficient time to complete the reselection before the next Target PO.

CRST3: This type of cell reselection may be performed for neighbor cells of type NGHBR CELL TYPE2.

This type of cell reselection requires more time than CRST1 and CRST2 as it requires additional time to change the RAT type and then synchronize to the neighbor cell frequency. Denote the time required to synchronize the other RAT neighbor frequency and to time align in a neighbor RAT as $NFIRC_t$ ms. If the Target PO is $NFIRC_t$ ms away, this type of cell reselection may be preferably performed in TW1, so that the client terminal can complete the cell reselection before the Target PO and it can receive the very first paging message in the target cell after cell reselection. If the Target PO is closer than $NFIRC_t$ ms, TW2 and TW3 are the preferred time windows where this type of cell reselection may be performed, which have sufficient time to complete the cell reselection before the next Target PO.

CRST4: This type of cell reselection may be performed for neighbor cells of types NGHBR CELL TYPE3, NGHBR CELL TYPE4, and NGHBR CELL TYPE5.

This type of cell reselection may be performed only if the current serving cell is also an acceptable cell and the client terminal is not currently registered to it. Since the client terminal is not registered in the current serving cell and not expected to receive the paging message, this type of cell reselection can be performed in any of the time windows TW1, TW2 or TW3.

CRST5: This type of cell reselection may be performed for neighbor cells of type NGHBR CELL TYPE6, NGHBR CELL TYPE7, and NGHBR CELL TYPE8.

In this case, since the client terminal does not have the stored information of the neighbor cell, after the cell reselection the client terminal may be required to do network registration procedure to receive paging messages. Since the network registration procedure requires network access and exchange of control messages between the client terminal and the network, it may take more time to complete the network registration procedure. Denote the time it takes for the client terminal to do the network registration procedure as $NCR_t$ ms in a neighbor RAT. Since receiving a paging message is very critical, the time at which the client terminal does this type of cell reselection is very critical for improved mobile terminated call performance and to avoid missing a paging message.

If the current serving cell is an acceptable cell where the client terminal is not expected to receive any mobile terminated call then the client terminal may perform this type of cell reselection in any of the time windows TW1, TW2 or TW3.

If the current serving cell is a suitable cell where the client terminal is registered and may receive paging message, then the client terminal may preferably perform this type of cell reselection in TW2 which may be suitable since the client terminal may have enough time to reselect to the target cell and complete the network registration procedure if required. Performing this type of cell reselection in TW3 may be acceptable, provided the time between the TW3 and the next Target PO is at least NCR ms. Performing this type of cell reselection in TW1 may be avoided because it may cause the client terminal to potentially miss the paging message that may be addressed to it in the current serving cell while doing the cell reselection to the neighbor cell.

According to an aspect of the present disclosure, a client terminal may decode the paging message in the current serving cell PO and may perform the CRST5 type cell reselection in either TW2 or TW3 and may avoid doing cell reselection in TW1.

Figure 4:
FIG. 4 illustrates an example of preferred timing of measurement and cell reselection under certain conditions such as Cell Reselection Type 5 (CRST5) according to the aspects of the present disclosure.

According to an aspect of the present disclosure, a client terminal may decode the paging message in the current serving cell PO and may perform the CRST5 type cell reselection in the time window TW4 specifically positioned for the purpose of CRST5 type cell reselection such that the cell reselection may complete just prior to the target cell PO as illustrated in FIG. 4.

The table contained FIG. 5 provides the summary of the neighbor cell type and the type of cell reselection that the client terminal may perform.

Scheduling the cell reselection in the correct time window may reduce the probability of any missed paging messages either in the serving cell or in the target cell. This in turn may improve the service availability in general and the mobile terminated call performance in particular.

Aspects of the present invention may be applied to all types of mobile communications systems based on standards such as 3GPP LTE, 3GPP Wideband Code Division Multiple Access (WCDMA), IEEE 802.16, Global System for Mobile Communications (GSM), General Packet Radio Service (GPRS), Enhanced Data rates for GSM Evolution (EDGE), Code division multiple access (CDMA), Evolution-Data Optimized (EV-DO, etc.

Figure 6:
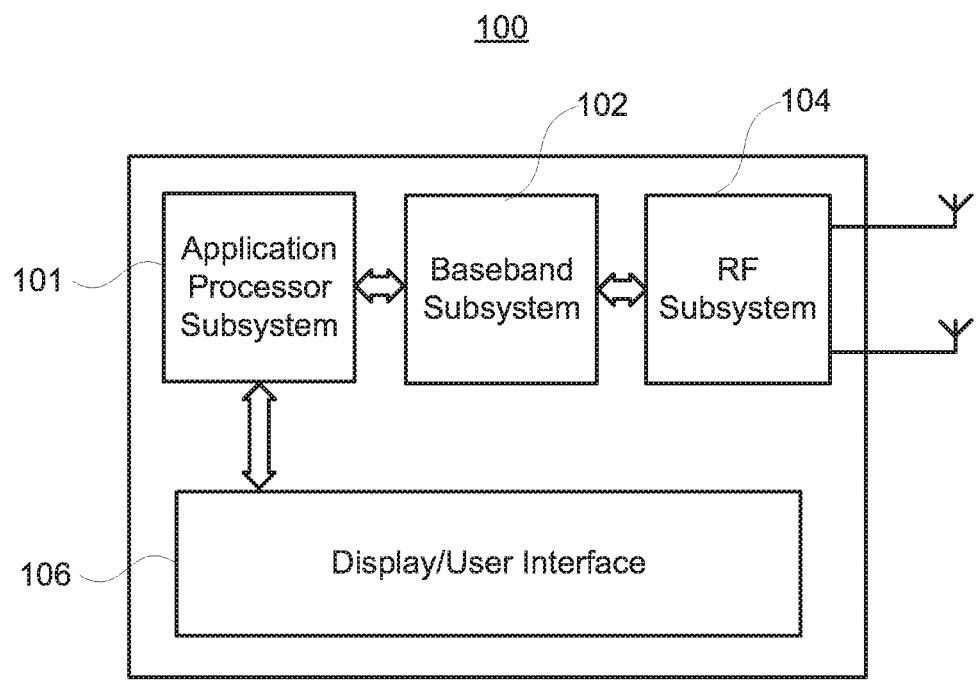
FIG. 6 illustrates a wireless mobile station diagram, which may be employed with aspects of the disclosure described herein.

By way of example only, the above-described method may be implemented in a receiver, e.g., a user device such as a wireless mobile station (MS) 100 as shown in FIG. 6.

As shown in FIG. 6, MS 100 may include an application processor subsystem 101, baseband subsystem 102 and a radio frequency (RF) subsystem 104 for use with a wireless communication network. A display/user interface 106 provides information to and receives input from the user. By way of example, the user interface may include one or more actuators, a speaker and a microphone. In some mobile devices, certain combination of the application processor subsystem 101, the baseband subsystem 102 and the RF subsystem 104 are all integrated as one integrated chip.

Figure 7:
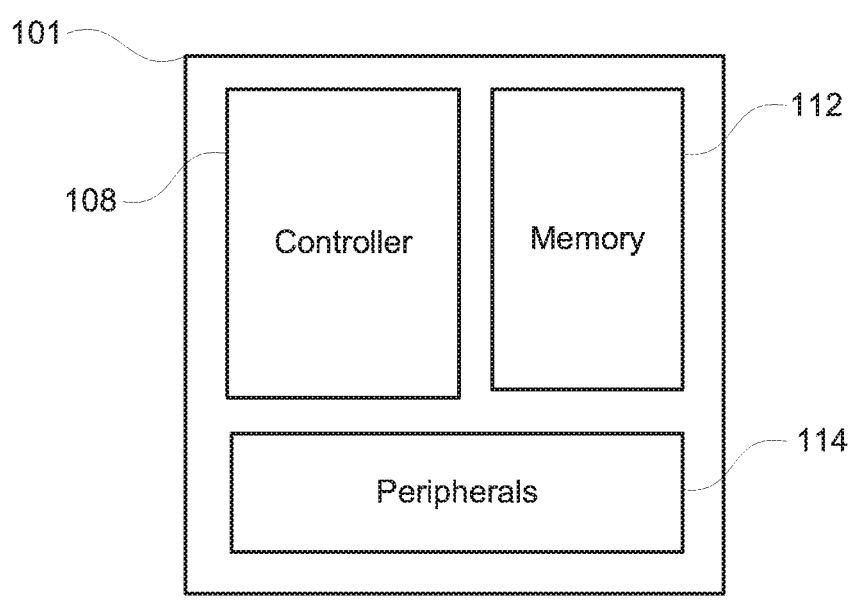
FIG. 7 illustrates an application processor subsystem for a wireless mobile station, which may be employed with aspects of the disclosure described herein.
Figure 8:
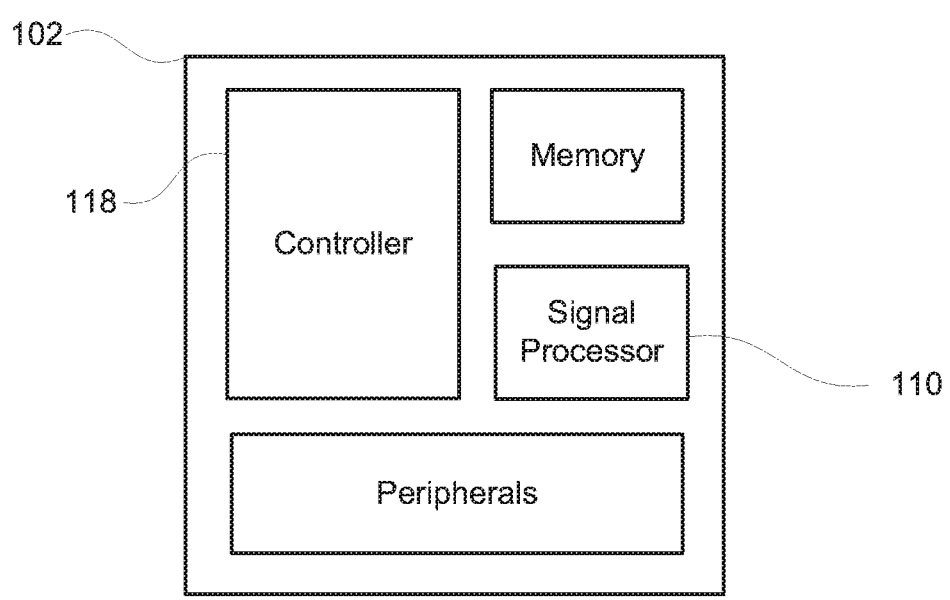
FIG. 8 illustrates a baseband subsystem for a wireless mobile station, which may be employed with aspects of the disclosure described herein.
Figure 9:
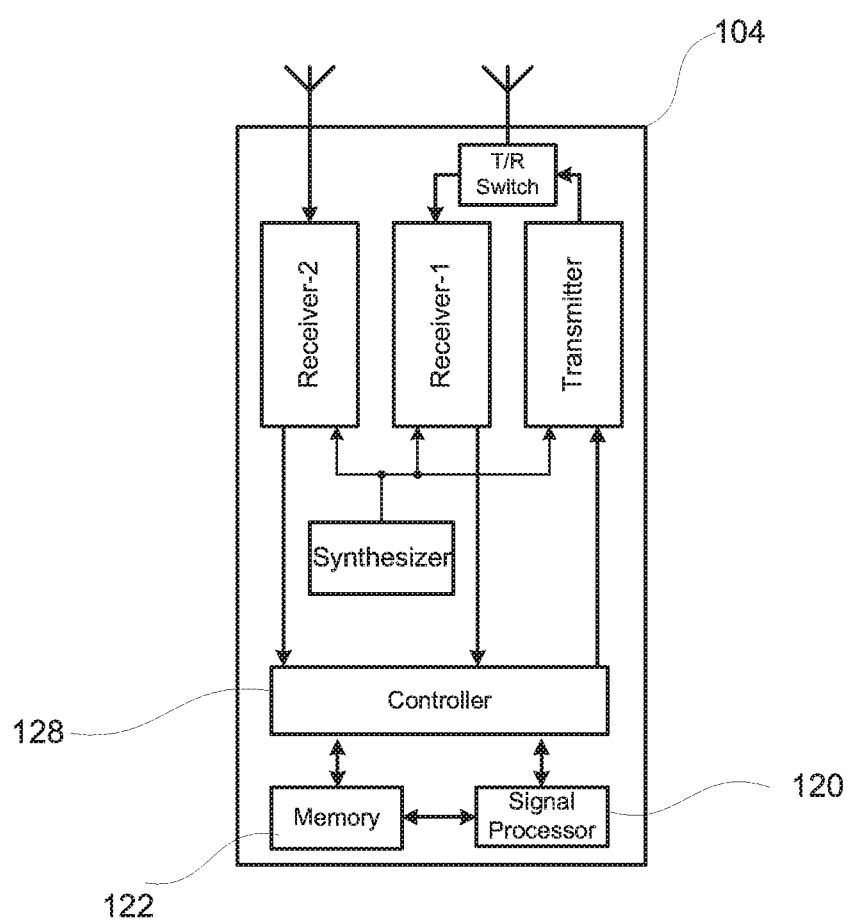
FIG. 9 illustrates a Radio Frequency (RF) subsystem for a wireless mobile station, which may be employed with aspects of the disclosure described herein.

The application processor subsystem 101 as shown in FIG. 7 may include a controller 108 such as a microcontroller, another processor or other circuitry. The baseband subsystem 102 as shown in FIG. 8 may include a controller 118 such as a microcontroller or other processor. The RF subsystem 104 as shown in FIG. 9 may include a controller 128 such as a microcontroller, another processor or other circuitry. The controller 108 desirably handles overall operation of the MS 100. This may be done by any combination of hardware, software and firmware running on the controller 108. Such a combination of hardware, software and firmware may embody any methods in accordance with aspects of the present disclosure.

Peripherals 114 such as a full or partial keyboard, video or still image display, audio interface, etc may be employed and managed through the controller 108.

Aspects of the present disclosure may be implemented in firmware of the controller 108 of the application processor and/or the controller 118 of the baseband subsystem. In another alternative, aspects of the present disclosure may also be implemented as a combination of firmware and hardware of the application processor subsystem 101 and/or the baseband subsystem 102. For instance, a signal processing entity of any or all of the FIG. 8 may be implemented in firmware, hardware and/or software. It may be part of the baseband subsystem, the receiver subsystem or be associated with both subsystems. In one example, the controller 118 and/or the signal processor 110 may include or control the protocol entity circuitry. The software may reside in internal or external memory and any data may be stored in such memory. The hardware may be an application specific integrated circuit (ASIC), field programmable gate array (FPGA), discrete logic components or any combination of such devices. The terms controller and processor are used interchangeably herein.

The consumer electronics devices that may use this disclosure may include smartphones, tablets, laptops, gaming consoles, cameras, video camcorders, TV, car entertainment systems, etc.

Although the disclosure herein has been described with reference to particular embodiments, it is to be understood that these embodiments are merely illustrative of the principles and applications of the present disclosure. It is therefore to be understood that numerous modifications may be made to the illustrative embodiments and that other arrangements may be devised without departing from the spirit and scope of the present disclosure as defined by the appended claims. Aspects of each embodiment may be employed in the other embodiments described herein.

The invention claimed is:

1. A method for cell reselection at a client terminal in a wireless communication system, the method comprising:
controlling, by a processing device at the client terminal, cell reselection for the client terminal based on determining a type of a neighbor cell for communication with the client terminal using the wireless communication system,
wherein the type of the neighbor cell is determined based on
whether stored information about the neighbor cell which is valid is available, in which the information about the neighbor cell is from a broadcast in the neighbor cell using the wireless communication system and is received by and stored at the client terminal, and
a determination, from the stored information which is valid, of a time of a next occurrence of a paging occasion (PO) in the neighbor cell in relation to a selected given time window to perform reselection to the neighbor cell from a current serving cell of the client terminal and at least two of (i) whether the neighbor cell is suitable or acceptable, (ii) whether the neighbor cell belongs to a current network registration area, (iii) whether the client terminal is registered to a current serving cell using a first Radio Access Technology (RAT) and a second RAT used by the neighbor cell which is different from the first RAT or (iv) whether network registration is required for inter-RAT cell reselection.

2. The method of claim 1, wherein the type of the neighbor cell is an inter-RAT neighbor cell or an intra-RAT neighbor cell,
wherein when the type of the neighbor cell is an inter-RAT neighbor cell, the type of the neighbor cell is an inter-frequency neighbor cell, and
wherein when the type of the neighbor cell is an intra-RAT neighbor cell, the type of the neighbor cell is an inter-frequency neighbor cell or an intra-RAT neighbor cell.

3. The method of claim 1, wherein whether the stored information about the neighbor cell is valid is determined based on a timer.

4. The method of claim 3, wherein the timer is refreshed such that the stored information is maintained valid, based on whether broadcast system information or a change mark for the broadcast system information is received at the client terminal.

5. The method of claim 1, wherein the stored information indicates at least one of a tracking area code (TAC), a Public Land Mobile Network Identity (PLMN ID), a Closed Subscriber Group Identity (CSG ID), a paging cycle, an updated network radio frame number or registration status.

6. The method of claim 1, wherein the type of the neighbor cell is determined to be at least one of: (i) a first type of neighbor cell for which the neighbor cell is an intra-frequency neighbor cell, the stored information for the neighbor cell is valid, the neighbor cell is a suitable cell and the neighbor cell belongs to the current network registration area; (ii) a second type of neighbor cell for which the neighbor cell is an inter-frequency neighbor cell, the stored information for the neighbor cell is valid, the neighbor cell is a suitable cell and the neighbor belongs to the current network registration area; (iii) a third type of neighbor cell for which the neighbor cell is an inter-RAT neighbor cell, the stored information for the neighbor cell is valid, the neighbor cell is a suitable cell, the neighbor cell belongs to the current network registration area and the client terminal is registered in the first RAT and the second RAT; (iv) a fourth type of neighbor cell for which the neighbor cell is an intra-frequency neighbor cell, the stored information for the neighbor cell is valid, the neighbor cell is an acceptable cell and the neighbor cell does not belong to the current network registration area; (v) a fifth type of neighbor cell for which the neighbor cell is an inter-frequency neighbor cell, the stored information for the neighbor cell is valid, the neighbor cell is an acceptable cell and the neighbor cell does not belong to the current network registration area; (vi) a sixth type of neighbor cell for which the neighbor cell is an inter-RAT neighbor cell, the stored information for the neighbor cell is valid, the neighbor cell is an acceptable cell and the neighbor does not belong to the current network registration area; (vii) a seventh type of neighbor cell for which the neighbor cell is an intra-frequency neighbor cell, the stored information for the neighbor cell is not valid and whether the neighbor cell belongs to the current network registration area is not known; (viii) an eighth type of neighbor cell for which the neighbor cell is an inter-frequency neighbor cell, the stored information for the neighbor cell is not valid and whether the neighbor cell belongs to the current network registration area is not known; or (ix) a ninth type of neighbor cell for which the neighbor cell is an inter-RAT neighbor cell, the stored information for the neighbor cell is not valid and whether the neighbor cell belongs to the current network registration area is not known.

7. The method of claim 1, further comprising:
controlling, by the processing device, determining a time window to perform the cell reselection based on the type of the neighbor cell, such that a first paging message at the PO in the neighbor cell and a second paging message at a PO of the serving cell are received by the client terminal when the cell reselection is being performed.

8. The method of claim 6, further comprising:
controlling, by the processing device, determining a time window to perform the cell reselection based on the type of the neighbor cell; and
wherein the cell reselection to be performed has a type including at least one of:
a first cell reselection type to be performed when the neighbor cell is determined to be the first type of neighbor cell, a second cell reselection type to be performed when the neighbor cell is determined to be the second type of neighbor cell, a third cell reselection type to be performed when the neighbor cell is determined to be the third type of neighbor cell, a fourth cell reselection type to be performed when the neighbor cell is determined to be the fourth, fifth or sixth type of neighbor cell, and a fifth cell reselection type to be performed when the neighbor cell is determined to be the seventh, eighth or ninth type of neighbor cell.

9. The method of claim 8, wherein a first time window TW1 and a second time window TW2 to perform the cell reselection are adjacent to a given PO of the serving cell, a third time window TW3 to perform the cell reselection is between first and second POs of the serving cell, and a time window TW4 to perform the cell reselection is immediately prior to a given PO of the neighbor cell, and
wherein, when the cell reselection to be performed is the fifth cell reselection type, the cell reselection is performed not in TW1 and in at least one of TW2, TW3 or TW4.

10. An apparatus for cell reselection at a client terminal in a wireless communication system, the apparatus comprising:
circuitry configured to control at the client terminal cell reselection for the client terminal based on determining a type of a neighbor cell for communication with the client terminal using the wireless communication system,
wherein the type of the neighbor cell is determined based on
whether stored information about the neighbor cell which is valid is available, in which the information about the neighbor cell is from a broadcast in the neighbor cell using the wireless communication system and is received by and stored at the client terminal, and
a determination, from the stored information which is valid, of a time of a next occurrence of a paging occasion (PO) in the neighbor cell in relation to a selected given time window to perform reselection to the neighbor cell from a current serving cell of the client terminal and at least two of (i) whether the neighbor cell is suitable or acceptable, (ii) whether the neighbor cell belongs to a current network registration area, (iii) whether the client terminal is registered to a current serving cell using a first Radio Access Technology (RAT) and a second RAT used by the neighbor cell which is different from the first RAT or (iv) whether network registration is required for inter-RAT cell reselection.

11. The apparatus of claim 10, wherein the type of the neighbor cell is an inter-RAT neighbor cell or an intra-RAT neighbor cell,
wherein when the type of the neighbor cell is an inter-RAT neighbor cell, the type of the neighbor cell is an inter-frequency neighbor cell, and
wherein when the type of the neighbor cell is an intra-RAT neighbor cell, the type of the neighbor cell is an inter-frequency neighbor cell or an intra-RAT neighbor cell.

12. The apparatus of claim 10, wherein whether the stored information about the neighbor cell is valid is determined based on a timer.

13. The apparatus of claim 12, wherein the timer is refreshed such that the stored information is maintained valid, based on whether broadcast system information or a change mark for the broadcast system information is received at the client terminal.

14. The apparatus of claim 10, wherein the stored information indicates at least one of a tracking area code (TAC), a Public Land Mobile Network Identity (PLMN ID), a Closed Subscriber Group Identity (CSG ID), a paging cycle, an updated network radio frame number or registration status.

15. The apparatus of claim 10, wherein the type of the neighbor cell is determined to be at least one of: (i) a first type of neighbor cell for which the neighbor cell is an intra-frequency neighbor cell, the stored information for the neighbor cell is valid, the neighbor cell is a suitable cell and the neighbor cell belongs to the current network registration area; (ii) a second type of neighbor cell for which the neighbor cell is an inter-frequency neighbor cell, the stored information for the neighbor cell is valid, the neighbor cell is a suitable cell and the neighbor belongs to the current network registration area; (iii) a third type of neighbor cell for which the neighbor cell is an inter-RAT neighbor cell, the stored information for the neighbor cell is valid, the neighbor cell is a suitable cell, the neighbor cell belongs to the current network registration area and the client terminal is registered in the first RAT and the second RAT; (iv) a fourth type of neighbor cell for which the neighbor cell is an intra-frequency neighbor cell, the stored information for the neighbor cell is valid, the neighbor cell is an acceptable cell and the neighbor cell does not belong to the current network registration area; (v) a fifth type of neighbor cell for which the neighbor cell is an inter-frequency neighbor cell, the stored information for the neighbor cell is valid, the neighbor cell is an acceptable cell and the neighbor cell does not belong to the current network registration area; (vi) a sixth type of neighbor cell for which the neighbor cell is an inter-RAT neighbor cell, the stored information for the neighbor cell is valid, the neighbor cell is an acceptable cell and the neighbor does not belong to the current network registration area; (vii) a seventh type of neighbor cell for which the neighbor cell is an intra-frequency neighbor cell, the stored information for the neighbor cell is not valid and whether the neighbor cell belongs to the current network registration area is not known; (viii) an eighth type of neighbor cell for which the neighbor cell is an inter-frequency neighbor cell, the stored information for the neighbor cell is not valid and whether the neighbor cell belongs to the current network registration area is not known; or (ix) a ninth type of neighbor cell for which the neighbor cell is an inter-RAT neighbor cell, the stored information for the neighbor cell is not valid and whether the neighbor cell belongs to the current network registration area is not known.

16. The apparatus of claim 10,
wherein the circuitry is configured to control determining a time window to perform the cell reselection based on the type of the neighbor cell, such that a first paging message at the PO in the neighbor cell and a second paging message at a PO of the serving cell are received by the client terminal when the cell reselection is being performed.

17. The apparatus of claim 15,
wherein the circuitry is configured to control determining a time window to perform the cell reselection based on the type of the neighbor cell; and
wherein the cell reselection to be performed has a type including at least one of:
a first cell reselection type to be performed when the neighbor cell is determined to be the first type of neighbor cell, a second cell reselection type to be performed when the neighbor cell is determined to be the second type of neighbor cell, a third cell reselection type to be performed when the neighbor cell is determined to be the third type of neighbor cell, a fourth cell reselection type to be performed when the neighbor cell is determined to be the fourth, fifth or sixth type of neighbor cell, and a fifth cell reselection type to be performed when the neighbor cell is determined to be the seventh, eighth or ninth type of neighbor cell.

18. The apparatus of claim 17, wherein a first time window TW1 and a second time window TW2 to perform the cell reselection are adjacent to a given PO of the serving cell, a third time window TW3 to perform the cell reselection is between first and second POs of the serving cell, and a time window TW4 to perform the cell reselection is immediately prior to a given PO of the neighbor cell, and
wherein, when the cell reselection to be performed is the fifth cell reselection type, the cell reselection is performed not in TW1 and in at least one of TW2, TW3 or TW4.

19. A wireless communication device comprising:
a receiver to receive a signal of a wireless communication system; and
a processing device configured to control cell reselection for the wireless communication device based on determining a type of a neighbor cell for communication with the wireless communication device using the wireless communication system,
wherein the type of the neighbor cell is determined based on
whether stored information about the neighbor cell which is valid is available, in which the information about the neighbor cell is from a broadcast in the neighbor cell using the wireless communication system and is received by and stored at the wireless communication device, and
a determination, from the stored information which is valid, of a time of a next occurrence of a paging occasion (PO) in the neighbor cell in relation to a selected given time window to perform reselection to the neighbor cell from a current serving cell of the client terminal and at least two of (i) whether the neighbor cell is suitable or acceptable, (ii) whether the neighbor cell belongs to a current network registration area, (iii) whether the wireless communication device is registered to a current serving cell using a first Radio Access Technology (RAT) and a second RAT used by the neighbor cell which is different from the first RAT or (iv) whether network registration is required for inter-RAT cell reselection.

20. The wireless communication device of claim 19, wherein the type of the neighbor cell is an inter-RAT neighbor cell or an intra-RAT neighbor cell,
wherein when the type of the neighbor cell is an inter-RAT neighbor cell, the type of the neighbor cell is an inter-frequency neighbor cell, and
wherein when the type of the neighbor cell is an intra-RAT neighbor cell, the type of the neighbor cell is an inter-frequency neighbor cell or an intra-RAT neighbor cell.

* * * * *